United States Patent
Huang et al.

(10) Patent No.: US 11,945,950 B2
(45) Date of Patent: Apr. 2, 2024

(54) GERM-REPELLENT SILICONE RUBBER AND PREPARATION METHOD AND APPLICATION THEREOF

(71) Applicant: Hongrita Plastics Ltd., Hong Kong (HK)

(72) Inventors: Xiaonan Huang, Hong Kong (HK); Xianqiao Liu, Hong Kong (HK); Chun Kit Choi, Hong Kong (HK)

(73) Assignee: Hongrita Plastics Ltd., Hong Kong (HK)

( * ) Notice: Subject to any disclaimer, the term of this patent is extended or adjusted under 35 U.S.C. 154(b) by 20 days.

(21) Appl. No.: 17/507,823

(22) Filed: Oct. 22, 2021

(65) Prior Publication Data
US 2022/0195191 A1   Jun. 23, 2022

(30) Foreign Application Priority Data

Dec. 18, 2020   (HK) .......................... 32020022392.5

(51) Int. Cl.
*C08L 83/04* (2006.01)
*C08K 5/00* (2006.01)
*C08L 71/02* (2006.01)

(52) U.S. Cl.
CPC ............ *C08L 83/04* (2013.01); *C08K 5/0058* (2013.01); *C08L 71/02* (2013.01)

(58) Field of Classification Search
CPC ........ C08L 83/04; C08L 71/02; C08K 5/0058
USPC ......................................................... 523/122
See application file for complete search history.

(56) References Cited

FOREIGN PATENT DOCUMENTS

| CN | 110698803 A | 1/2020 | |
|---|---|---|---|
| WO | WO-2007001869 A2 * | 1/2007 | ............... A61K 6/10 |

OTHER PUBLICATIONS

Shan Xu et al., Preparation of addition-curable silicone rubber for HID lamp, Adhesion, Dec. 31, 2009, pp. 50-52, No. 5.
Xue-Gui, Zhan et al., Discussion on Influencing Factors of Tear Resistance of HTV Silicone Rubber, Silicone Material, Jan. 31, 2021, pp. 35-41 and 62, vol. 35, No. 1.
Li-Ya Jia et al., Development of High Transparency and High Hardness Silicone Rubber, Silicone Material, Sep. 30, 2020, pp. 21-24, vol. 34, No. 5.

* cited by examiner

*Primary Examiner* — David T Karst

(57) ABSTRACT

The present invention provides a germ-repellent silicone rubber comprising: a silicone rubber substrate and a germ-repellent active ingredient incorporated therein; wherein, the silicone rubber substrate includes polydimethylsiloxane; the germ-repellent active ingredients include poly(ethylene oxide) and silicone oil or their derivatives. The disclosed germ-repellent silicone rubber reduces the bacterial growth by inhibiting their adherence to the surface instead of killing them, does not contribute to super bacteria formation nor cause skin irritation.

4 Claims, 6 Drawing Sheets

| | Shin-Etsu KE-2090 (2 phr) | Wacker LR 3038 (2 phr) | Shin-Etsu CHN-2003 (2 phr) |
|---|---|---|---|
| LSR control samples | | | |
| GR-LSR | | | |

| GR modifiers<br>Characterization | 0193 | GR-LSR (Bi-component GR modifier) |
|---|---|---|
| Appearance of LSR control | | |
| Appearance of GR-LSR | | |
| Remarks | Turning white × | Highly transparent ✓ |

Figure 5

|  | No wash |  |
|---|---|---|
| LSR control group | S.A | E.Coli |
|  | Washed 270 times | |
| GR-LSR | S.A: -99.0% | E.Coli: -96.7% |

Figure 6

GERM-REPELLENT SILICONE RUBBER AND PREPARATION METHOD AND APPLICATION THEREOF

CROSS REFERENCE TO RELATED APPLICATIONS

The present application claims the benefit of a Hong Kong Short-term Patent Application No. 32020022392.5 filed on Dec. 18, 2020, the contents of which are hereby incorporated by reference in their entirety.

FIELD OF INVENTION

The invention relates to the field of antibacterial technology, in particular to a germ-repellent silicone rubber and preparation method and application thereof.

BACKGROUND

The current biocides or antimicrobial agents such as chlorine or silver-ion derivatives, which normally cause the discoloration in both manufacturing and application, limited antimicrobial efficacy due to leaching, and also regulatory incompliance for some personal care and food contact applications. Furthermore, the conventional biocides or silver-based antimicrobial agents would promote the development of drug-resistant super bacteria and/or have cytotoxic effect to human.

Studies have found that microorganisms navigate and divide on surfaces to form multicellular structures called biofilms, the most widespread survival strategy found in the bacterial world. Biofilms are communities of microorganisms that attach to each other and to surfaces, for example by bacterial adherence. Biofilms can be problematic in certain places, for example plastic surface or on medical implants. NAMI's built-in germ-repellent technology has received a warm reception from the industry due to its ability to prevent bacterial growth without releasing bacteria-killing actives. The difference between bacteria-killing and bacteria-repelling is shown as in FIG. 1A and FIG. 1B. Based on this theory, the development of materials that prevent bacterial adhesion would be an attractive invention.

SUMMARY OF INVENTION

To solve the above problems, the present invention provides a germ-repellent silicone rubber (GR-SR). The disclosed germ-repellent silicone rubber reduces the bacterial growth by inhibiting their adherence to the surface instead of killing them, does not contribute to super bacteria formation nor cause skin irritation.

Another object of the present invention is to provide a preparation method of germ-repellent silicone rubber.

Another object of the present invention is to provide the use of the germ-repellent silicone rubber.

To achieve the above objective, the present invention provides a germ-repellent silicone rubber comprising: a silicone rubber substrate and a germ-repellent active ingredient incorporated therein; wherein, the mass ratio of the silicone rubber substrate to the germ-repellent active ingredient is 100:(2-10); the silicone rubber substrate includes component A and component B, component A includes polydimethylsiloxane with vinyl groups; component B includes polydimethylsiloxane with functional groups; the germ-repellent active ingredient includes a polyethoxylated non-ionic surfactant, wherein the polyethoxylated non-ionic surfactant is selected from a combination of polyethylene glycol or the derivatives thereof with silicone oil.

From the perspective of the survival strategy of microorganisms, the present invention develops a germ-repellent silicone rubber, its built-in germ-repellent technology has received a warm reception from the industry due to its ability to prevent bacterial growth without releasing bacteria-killing actives.

According to some specific embodiments of the present invention, wherein the mass ratio of the silicone rubber substrate to the germ-repellent active ingredient is 100:(2-3).

According to some specific embodiments of the present invention, the mass ratio of component A to component B is (0.5-1.5): (0.5-1.5).

According to some specific embodiments of the present invention, wherein the mass ratio between polyethylene glycol or the derivatives thereof and silicone oil is (60-40):(40-60).

According to some specific embodiments of the present invention, wherein said polyethylene glycol or the derivatives thereof comprises PEG 200, PEG 400, mPEG 600, and poly(ethylene glycol) sorbitol hexaoleate.

According to some specific embodiments of the present invention, wherein the germ-repellent efficacy of the germ-repellent silicone rubber could reach up to 99%.

The germ-repellent silicone rubber has no more than 10% light transmittance loss compared with the unmodified silicone rubber.

The germ-repellent silicone rubber has no more than 20% mechanical tensile strength decrease compared with the unmodified silicone rubber.

The invention also provides a preparation method of germ-repellent silicone rubber, comprising the following steps: mixing the silicone rubber substrate with the germ-repellent active ingredient.

According to some specific embodiments of the present invention, comprising the following steps: (1) Material preparation: connecting polydimethylsiloxane with vinyl group and form component A; Connecting functional groups on polydimethylsiloxane and form component B; Combining polyethylene glycol or the derivatives thereof with silicone oil to form component C; (2) Mixing: Mixing the components A, B and C thoroughly.

According to some specific embodiments of the present invention, wherein the mixing step is carried out by a static mixer.

The invention also provides the use of the germ-repellent silicone rubber in baby and personal care materials.

The disclosed germ-repellent silicone rubber is highly transparent and could reach up to 99% germ repellent efficacy. The germ-repellent silicone rubber utilizes biocide-free, built-in germ-repellent agents at competitive cost, which is non-leachable and no discoloration of base polymers.

BRIEF DESCRIPTION OF THE DRAWINGS

FIG. 5 shows the transparency of samples treated with Bi-component GR modifier and single-component modifier before and after treatment.

FIG. 6 shows the durability test results.

DETAILED DESCRIPTION OF INVENTION

Figure 1A:
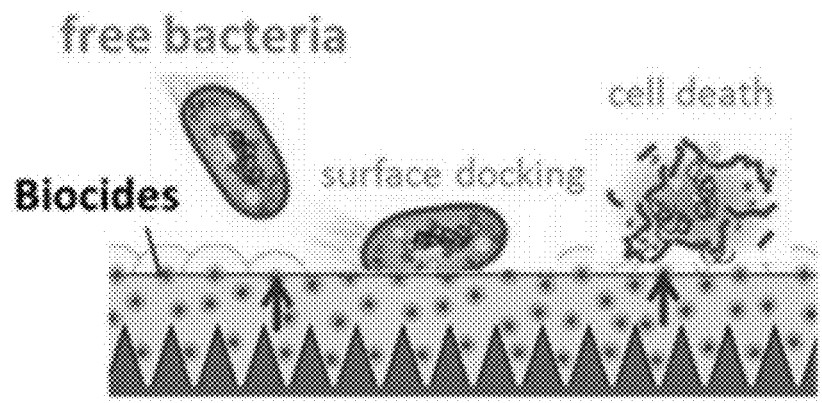
FIG. 1A shows the schematic illustration of the bacteria-killing mechanism.

The present invention is not to be limited in scope by any of the following descriptions. The following examples or embodiments are presented for exemplification only.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of preparation described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Definitions

The singular forms "a,", "an" and "the" can include plural referents unless the context clearly dictates otherwise.

The term "about" can allow for a degree of variability in a value or range, for example, within 10%, or within 5% of a stated value or of a stated limit of a range.

The term "phr" defines as the per hundred rubber, which refers to the compound ingredients given as parts per 100 unit mass of the rubber polymer, which is prevalently referred as the polymeric base resin.

DESCRIPTION

The following examples accompanied with drawings will illustrate the present invention in more detail.

Figure 1B:
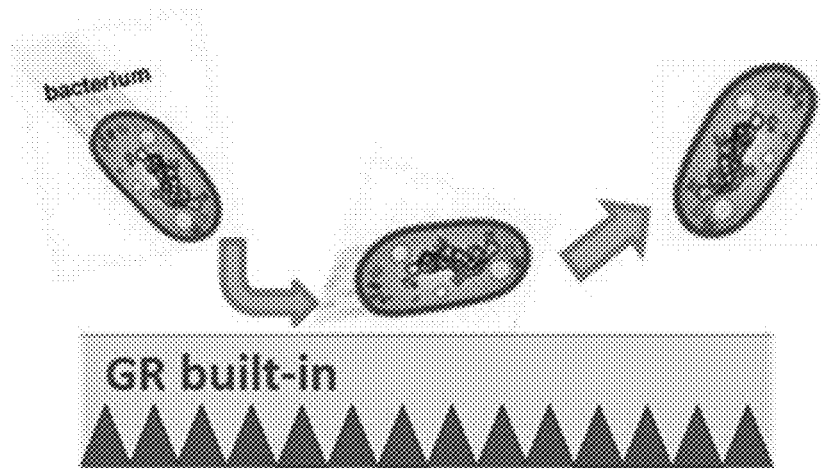
FIG. 1B shows the schematic illustration of the germ-repellent mechanism.

FIGS. 1A-1B show a major advantage of the germ-repellent technology of the present invention over the conventional bacteria-killing approach relying on the use of antibiotics or silver ion-based bactericidal formulations. The conventional biocides or silver-based antimicrobial agents would promote the development of drug-resistant super bacteria and/or have cytotoxic effect to human. The built-in germ-repellent technology of the present invention reduces bacterial growth by inhibiting their adherence to the surface instead of killing them, does not contribute to super bacteria formation nor cause skin irritation. What's more, the service life of germ-repellent products is longer and more cost effective.

EXAMPLES

Germ-Repellent Silicone

Silicone is one of the most versatile thermoset polymers for medical and food-grade applications due to its highly inert chemistry and strong silicon-oxygen bonding. Herein, platinum-cured silicone rubber (Silopren LSR2060 (Momentive)) will be studied as follows.

To impart germ-repellent properties into the silicone rubber, different modifiers were incorporated into the base materials (LSR). The effective modifiers can be polyethylene glycol (PEG), polypropylene glycol (PPG), PEG or PPG terminated, or copolymers with side chains of PEG or PPG groups, as indicated in Table 1.

TABLE 1

Material list for additives to be used for modifying silicone

| Name | Brand | Chemical Formula | HLB Number |
|---|---|---|---|
| ENEA-0260 Allyloxy (polyethylene)oxide | Gelest | $H_3C\!\!-\!\!CH=CH_2\!-\!O\!-\!(CH_2CH_2O)_n\!-\!OH$ | 5-8 |
| silicone polyether copolymer | Gelest | (polydimethylsiloxane-polyether copolymer structure with $(EO)_m$, $(PO)_n$, R groups) | |
| SIA0479.0 O-allyloxy (polyetheneoxy) trimethylsilane | Gelest | $CH_2=CH\!-\!CH_2\!-\!(OCH_2CH_2)_n\!-\!O\!-\!Si(CH_3)_3$ | N/A |
| OFX-0193 silicone polyether copolymer | Dow Corning | (silicone polyether copolymer structure with $-(CH_2)_3-O-(CH_2CH_2O)_{12}-OH$ side chain) | 12.2 |
| PEG 200 Polyethylene glycol, Mw.200 | Kermel_Tianjing | $H\!-\!(OCH_2CH_2)_n\!-\!OH$ | 9.1 |
| PEG 400 Polyethylene glycol, Mw.400 | Kermel_Tianjing | $H\!-\!(OCH_2CH_2)_n\!-\!OH$ | 12.9-13.1 |
| mPEG 600 Methyl polyethylene glycol, Mw.600 | Chenrun_Nantong | $H_3C\!-\!(OCH_2CH_2)_n\!-\!OH$ | 19.5 |
| TWEEN ®80 Polyoxyethylenesorbitan monooleate | Sigma | Remark 1 | 15 |

Remark 1:

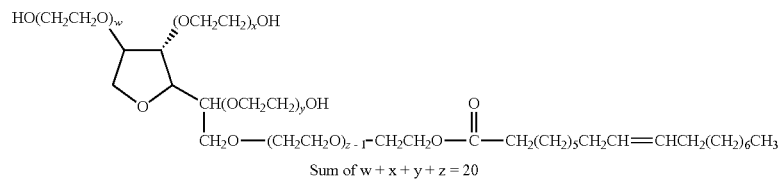

Sum of w + x + y + z = 20

Preparation of Germ-Repellent Silicone

The germ-repellent silicone (LSR) sample could be prepared by separately weighing Part A (polydimethylsiloxane with vinyl groups) and Part B (polydimethylsiloxane with functional groups) of LSR system into a clean plastic cup. Then specific amounts of modifier in phr are added into the same cup. As an example, in the preparation of germ-repellent silicone rubber(LSR2060/2 phr (PEG 200+ silicone oil)), 50 g of Part A, 50 g of Part B and 2 g of (PEG 200+ silicone oil) were weighed into a clean cup. Wherein the mass ratio between PEG and silicone oil is 1:1. A high-speed mixer operating at 2000 rpm for 5 mins was used for the mixing. The mixing could also be accomplished in a liquid injection molding (LIM) machine, where the LSR and the liquid modifier could be fed into and mixed in the injection screw as a single mixing step. After mixing, the curing processes of different grades of LSR are shown in Table 2. The sheets were cut into desired 4 cm×4 cm plastic sheet for germ-repellence evaluation or die-cut into sample specimens according to the relevant ASTM standard for mechanical properties determination.

TABLE 2

Curing condition for silicone rubbers

| LSR grade | Processing |
|---|---|
| Shin-Etsu KE-2090 (self-bonding, medical grade) | 120° C. × 10 mins + 150° C. × 1 Hr |
| Wacker LR 3038 (food-contact grade) | 165° C. × 5 mins + 200° C. × 4 Hrs |
| Shin-Etsu CHN 2003 (No post cure grade) | 120° C. × 10 mins |

Germ-Repellent Efficacy of Modified LSR2060

Figure 2:
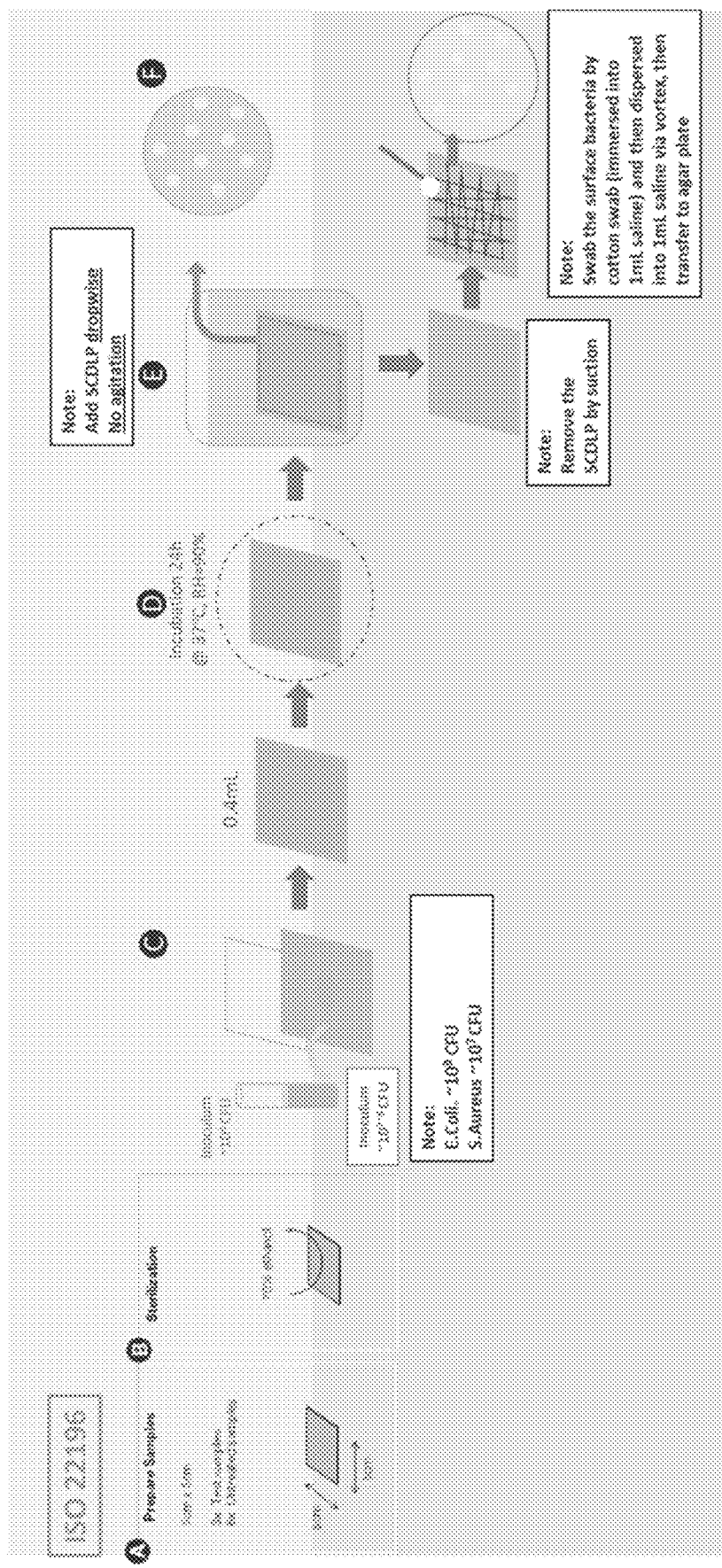
FIG. 2 shows the procedure of swab testing of the germ-repellent silicone rubber with referring to ISO 22196 industrial standard.

Test specimen will be made into a 5×5 cm sheet with 0.5-2 mm thickness. The present invention referred to the industrial testing standard ISO 22196 to characterize the germ-repellent efficacy. FIG. 2 shows the detailed procedure for germ-repellent test, which is also called as swab test. This test can be carried out by experiment and accredited third parties (e.g. SGS).

Experiments of the present invention confirmed the feasibility of developing a GR-SR formulation with 99% reduction of bacterial growth by adding poly (ethylene glycol) or its derivatives with silicone oil into the silicone rubber substrate. The specific GR efficacy testings are shown in table 3 and table 4.

It can be seen from table 3 that the germ-repellent silicone rubber of the present invention has strong GR efficacy. It can be seen from table 4 that the Bi-component GR modifier has a better effect than the single-component modifier.

TABLE 3

GR efficacy testing

| LSR Grade | GR efficacy testing results (2 phr modifier) | |
|---|---|---|
| | E. coli | S.A. |
| Shin-Etsu KE-2090 (self-bonding, medical grade) | −97.9% | −98.4% |
| Wacker LR 3038 (food-contact grade) | −96.4% | −98.4% |
| Shin-Etsu CHN 2003 (No post cure grade) | −99.4% | −96.7% |

TABLE 4

GR efficacy comparison (LSR base resins:Shin-Etsu KE-2090)

| LSR Grade | GR-SR formulations | GR efficacy test | | Remarks |
|---|---|---|---|---|
| | | E.coli | S.A. | |
| Shin-Etsu KE-2090 | OFX-0193 (silicone polyether copolymer GR modifier) | −91.1% | −76.1% | x |
| | GR-SR (Bi-component GR modifier) | −99.5% | −98.2% | ✓ |

Transparency Comparison

Figures 3, 4:
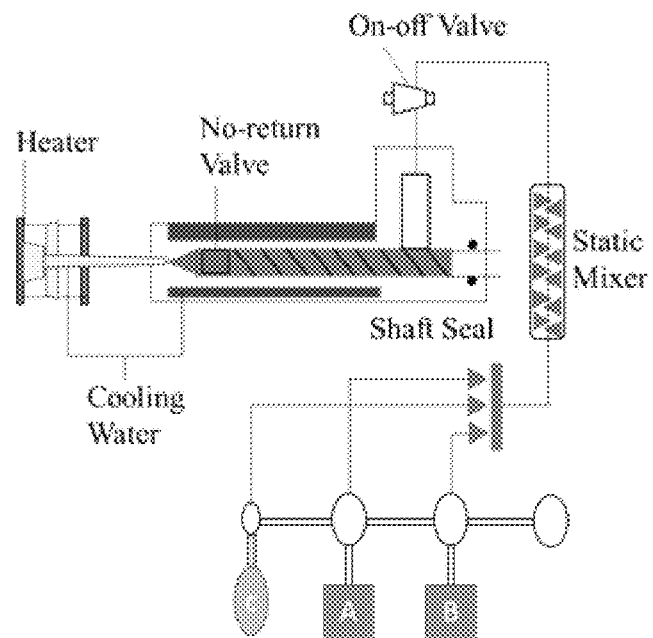
FIG. 3 shows the industrial manufacturing process for LSR products.
FIG. 4 shows the transparency of the three samples before and after the treatment.

The transparency comparison results are shown in table 5. The transparency of the three samples before and after the treatment is shown in FIG. 4. The transparency of samples treated with Bi-component GR modifier and single-component modifier before and after treatment is shown in FIG. 5.

It can be seen from table 5 and FIG. 4 that the germ-repellent silicone rubber of the present invention has good transparency. It can be seen from FIG. 5 that the Bi-component GR modifier has a better effect on transparency than the single-component modifier.

TABLE 5

GR-SR transparency

| | Shin-Etsu KE-2090 (2 phr) | Wacker LR 3038 (2 phr) | Shin-Etsu CHN-2003 (2 phr) |
|---|---|---|---|
| Reduced Light Transmittance (GR-SR vs control) | −6.2% | −3.6% | −3.6% |

GR Efficacy—Durability

The durability test results are shown in FIG. 6. It can be seen from FIG. 6 that after been washed 270 times, the sample can still maintain high efficacy.

Mechanical Properties of Germ-Repellent Silicone

Figure 7:
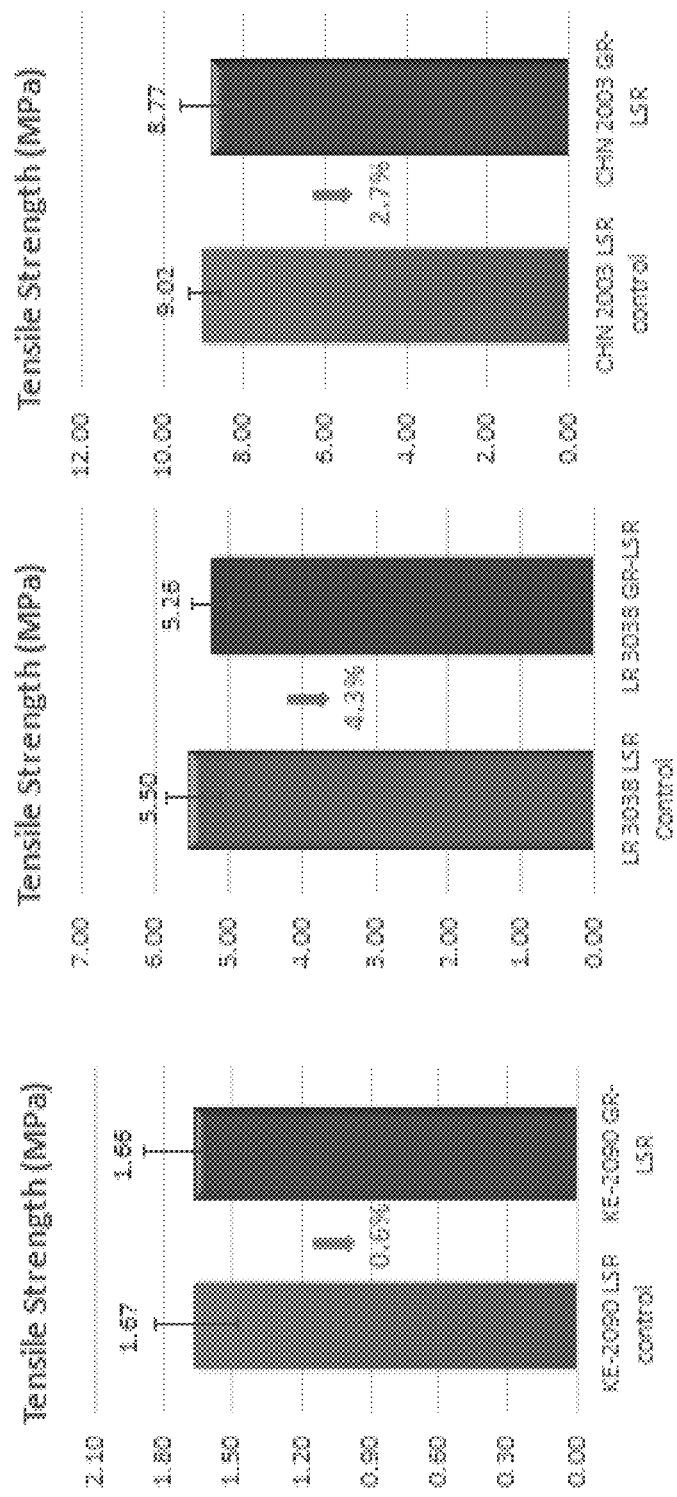
FIG. 7 shows the mechanical properties of germ-repellent silicone.

The property of Tensile strength is determined for the selected GR-modified SR (FIG. 7). It can be seen from FIG. 7 that all 3 GR-SR samples mechanical strength reduction <5% versus unmodified control according to ASTM D 412.

Application

In the final stage of the project, we will integrate our germ-repellent SR formulation into sponsor's existing manufacturing process in plant. The current production process is thermoset injection molding (FIG. 3). The mold shapes can be chosen for pacifier, teether, bottle, facial cleaning head or mouth piece according to sponsor's requirements.

Material Safety Assessment

These as-prepared GR-SR prototypes are intended for baby and personal care applications. The add-on germ-repellent agents selected are generally recognized as safe (GRAS) agents. To evaluate their material safety, the GR-SR prototypes will be tested according to industrial standards such as FDA21 CFR 177.2600, EU food contact AP2004-5, REACH etc., specifically for products intended for contact with food, 9migration tests evaluate the overall or specific migration after extracted in solvents (e.g. water, n-hexane, acetic acid, etc.). Material food contact testing will be conducted at accredited external laboratories according to industrial standards, such as US FDA CFR 21 Part 177.2600 titled "rubber articles intended for repeated use". It sets the extraction limit for water (aqueous food) and n-hexane (fatty foods) at a reflux condition for 7 hours, as 20 mg/in$^2$ and 175 mg/in$^2$ respectively. A succeeding 2 hours extraction under the same condition should contain extractable within the limit of 1 and 4 mg/in$^2$ respectively. The EU food contact AP2004-5 is for silicone rubber overall migration (water, 3% acetic acid, 10% ethanol, substitute of rectified olive oil) will be conducted at externally as well. The test results of the samples in this application are all passed.

The invention claimed is:
1. A germ-repellent silicone rubber comprising: a silicone rubber substrate and germ-repellent active ingredients incorporated therein; wherein the mass ratio of the silicone rubber substrate to the germ-repellent active ingredient is 100:(2-10);
the silicone rubber substrate includes component A and component B, component A includes polydimethylsiloxane with vinyl groups; component B includes polydimethylsiloxane with functional groups;

the germ-repellent active ingredients include a polyethoxylated non-ionic surfactant, wherein the polyethoxylated non-ionic surfactant is selected from a combination of polyethylene glycol or the derivative thereof with silicone oil;

wherein said polyethylene glycol or the derivative thereof comprises polyethylene glycol 200, polyethylene glycol 400, methyl polyethylene glycol 600, and poly(ethylene glycol) sorbitol hexaoleate.

2. The germ-repellent silicone rubber according to claim 1, wherein the mass ratio of the silicone rubber substrate to the germ-repellent active ingredient is 100:(2-3).

3. The germ-repellent silicone rubber according to claim 1, wherein the mass ratio of component A to component B is (0.5-1.5):(0.5-1.5).

4. The germ-repellent silicone rubber according to claim 1, wherein the mass ratio between said polyethylene glycol or the derivative thereof and silicone oil is (60-40):(40-60).

* * * * *